March 8, 1932.   J. P. ALDRICH ET AL   1,848,405
MACHINE FOR SHAPING AND CUTTING BUTTER OR LIKE MATERIALS
Filed Aug. 10, 1929    8 Sheets-Sheet 3
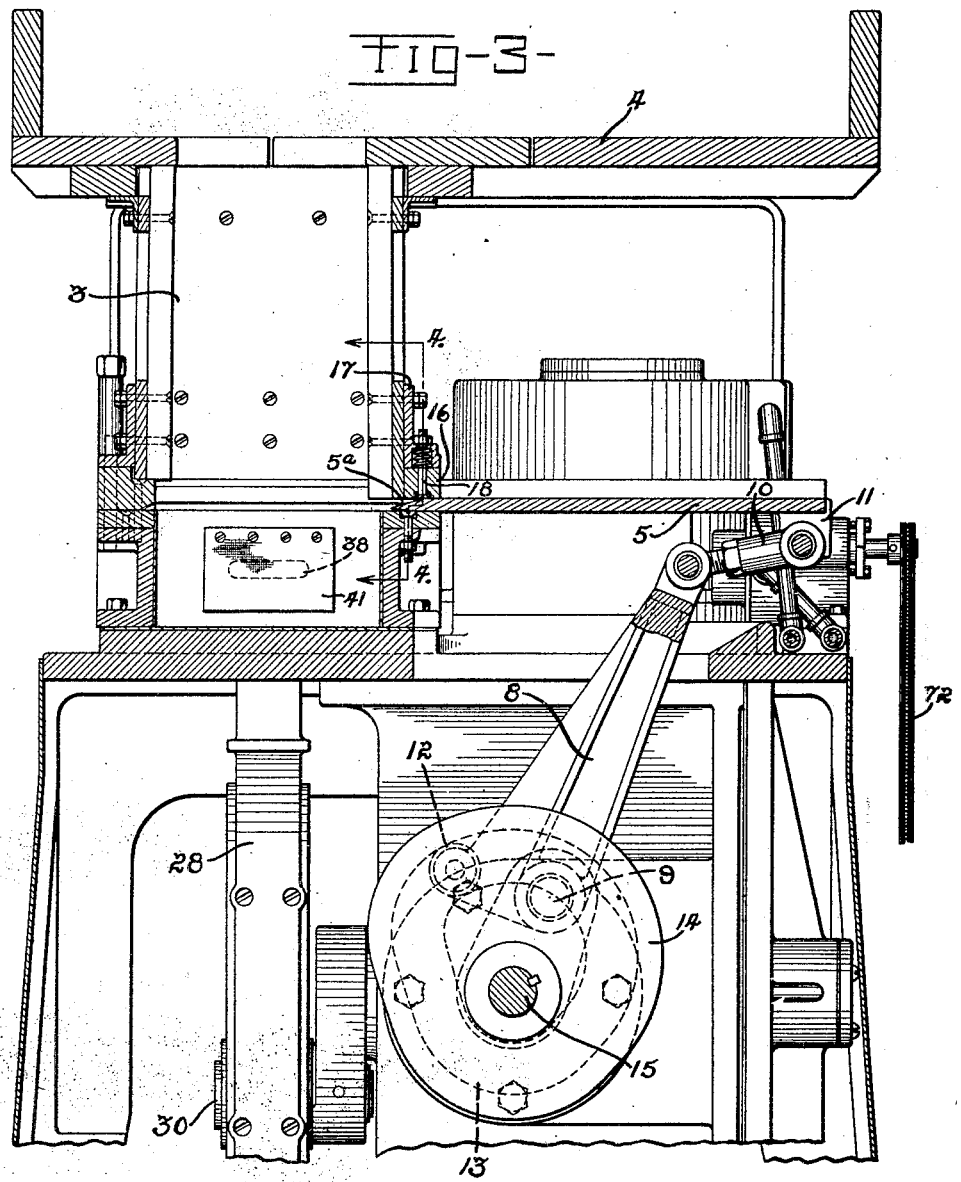
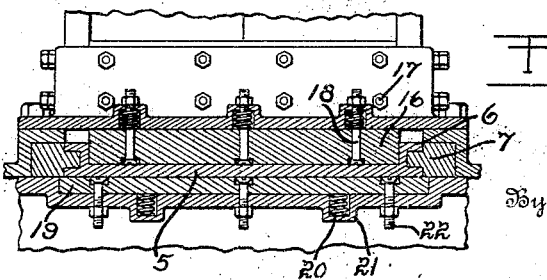
Inventors
John P. Aldrich
Howard A. Morris
By
Owen + Owen
Attorneys

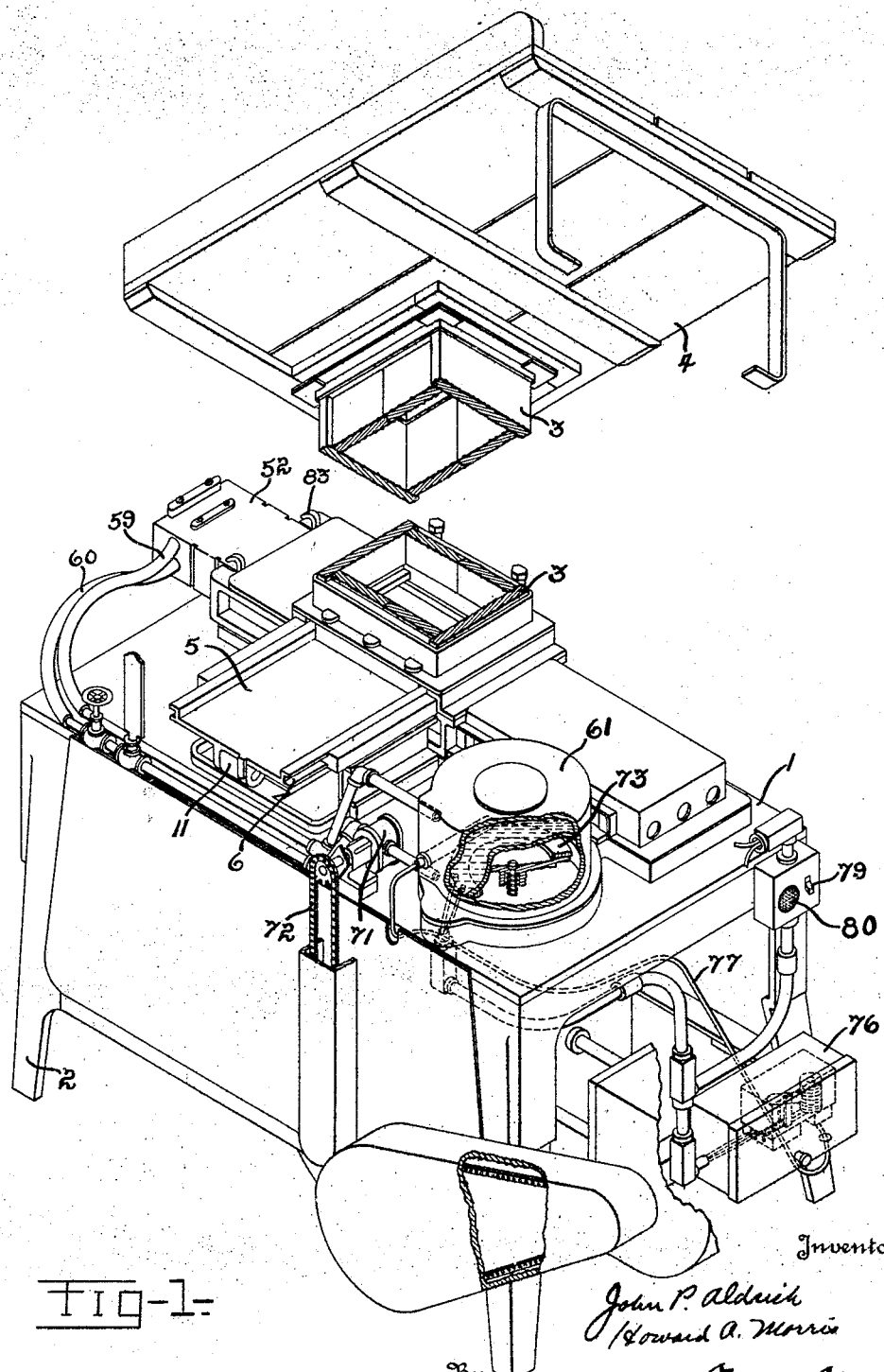

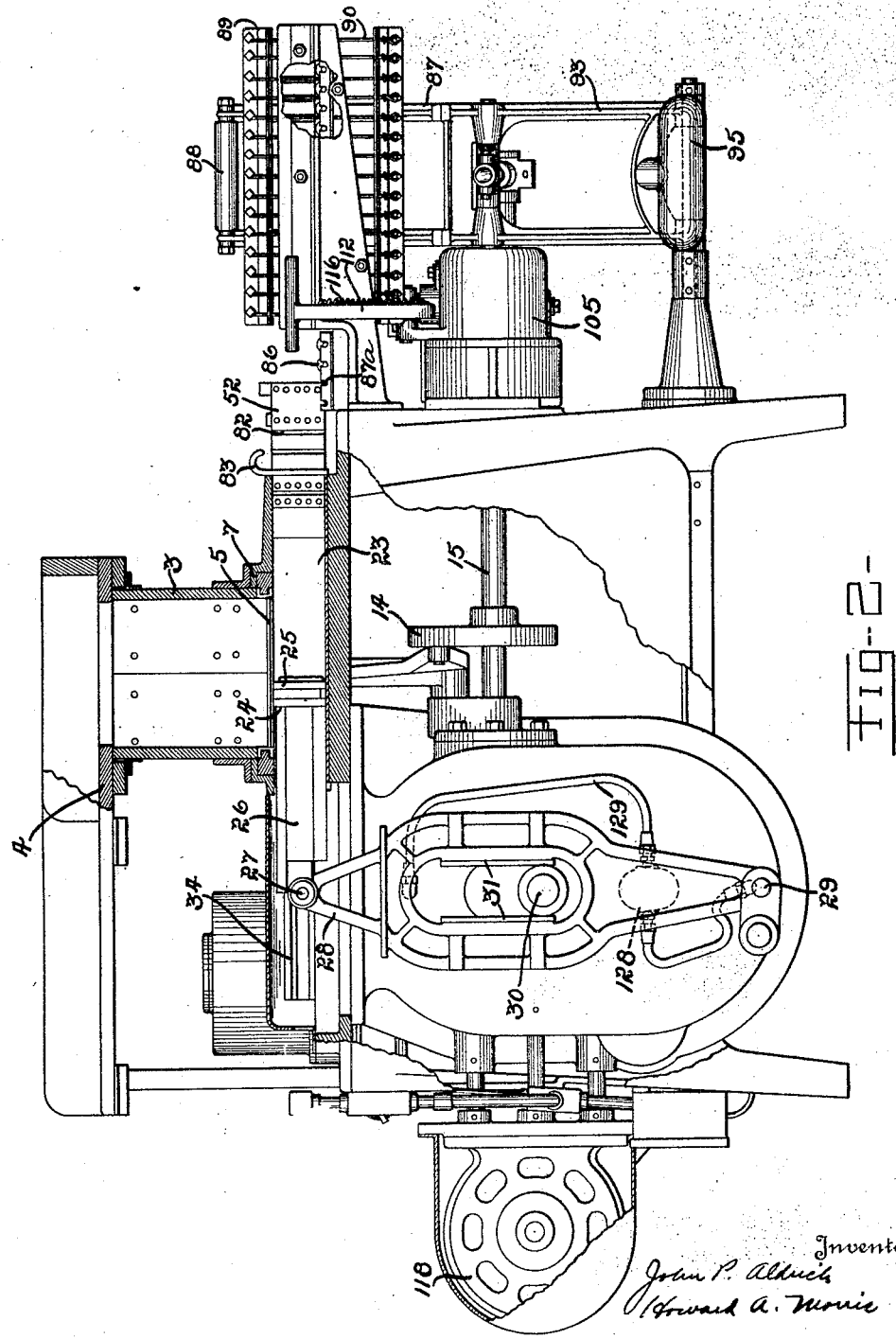

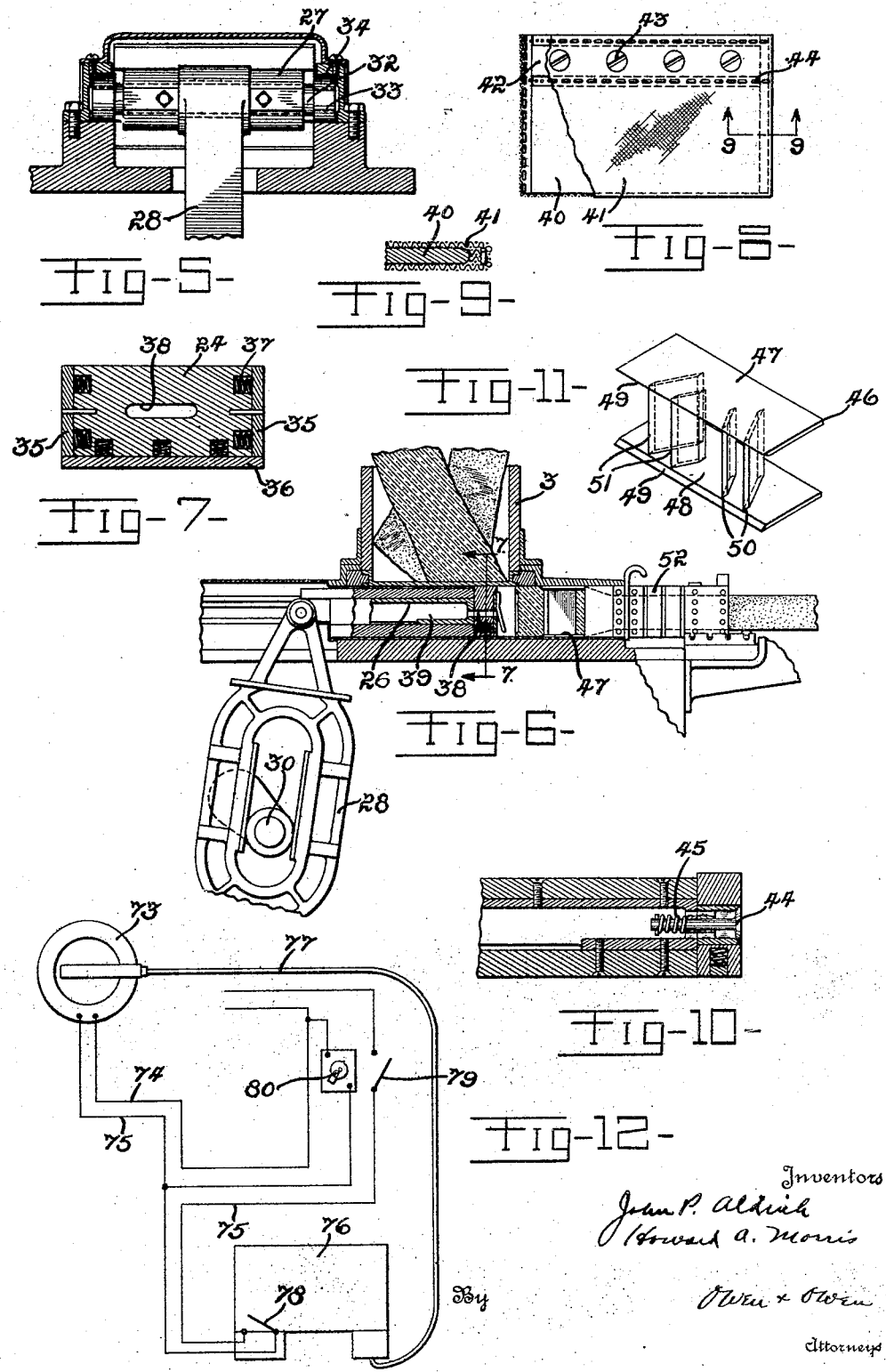

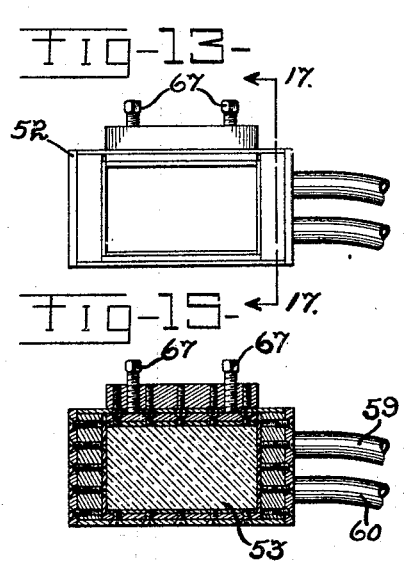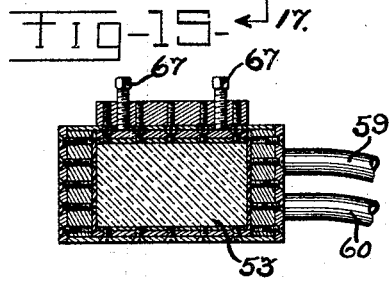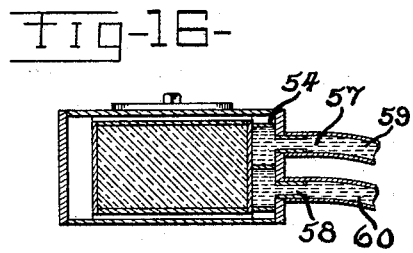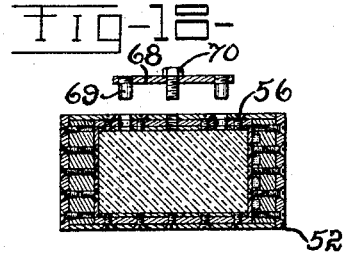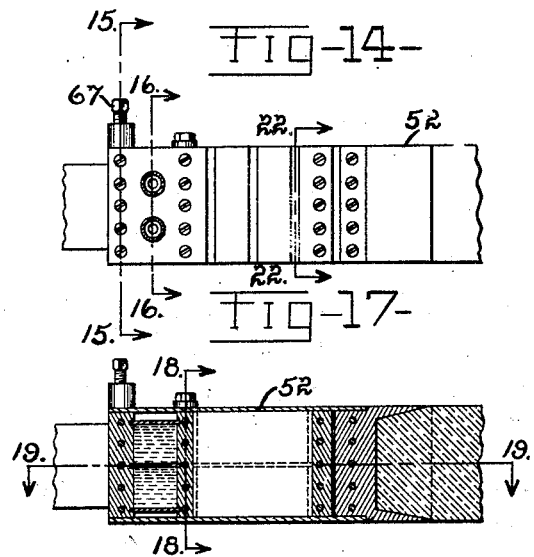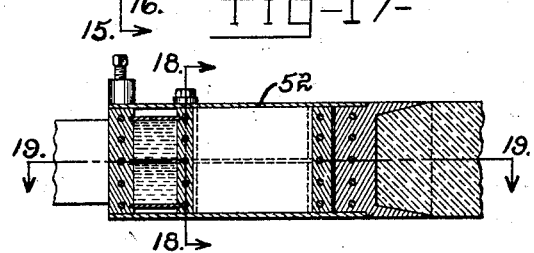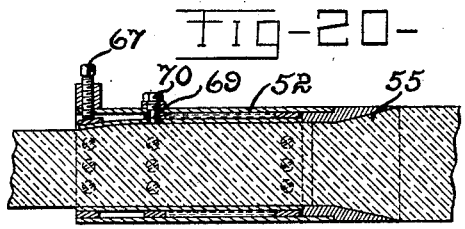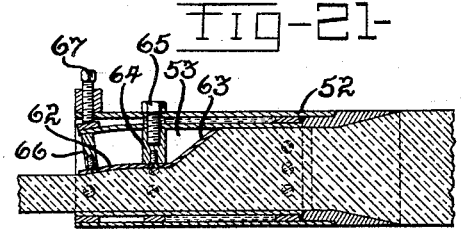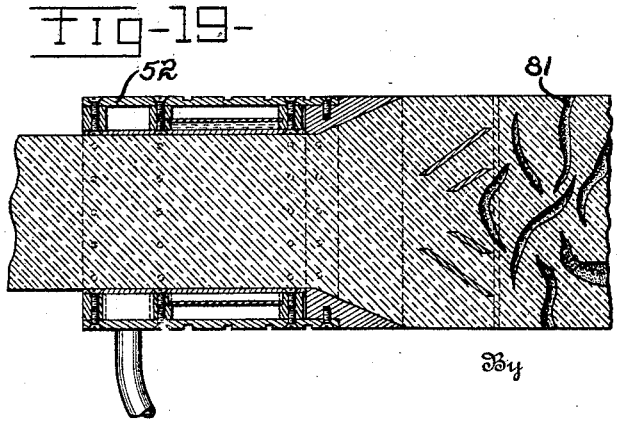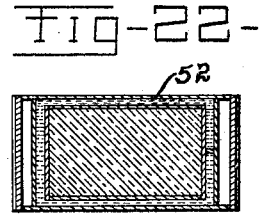

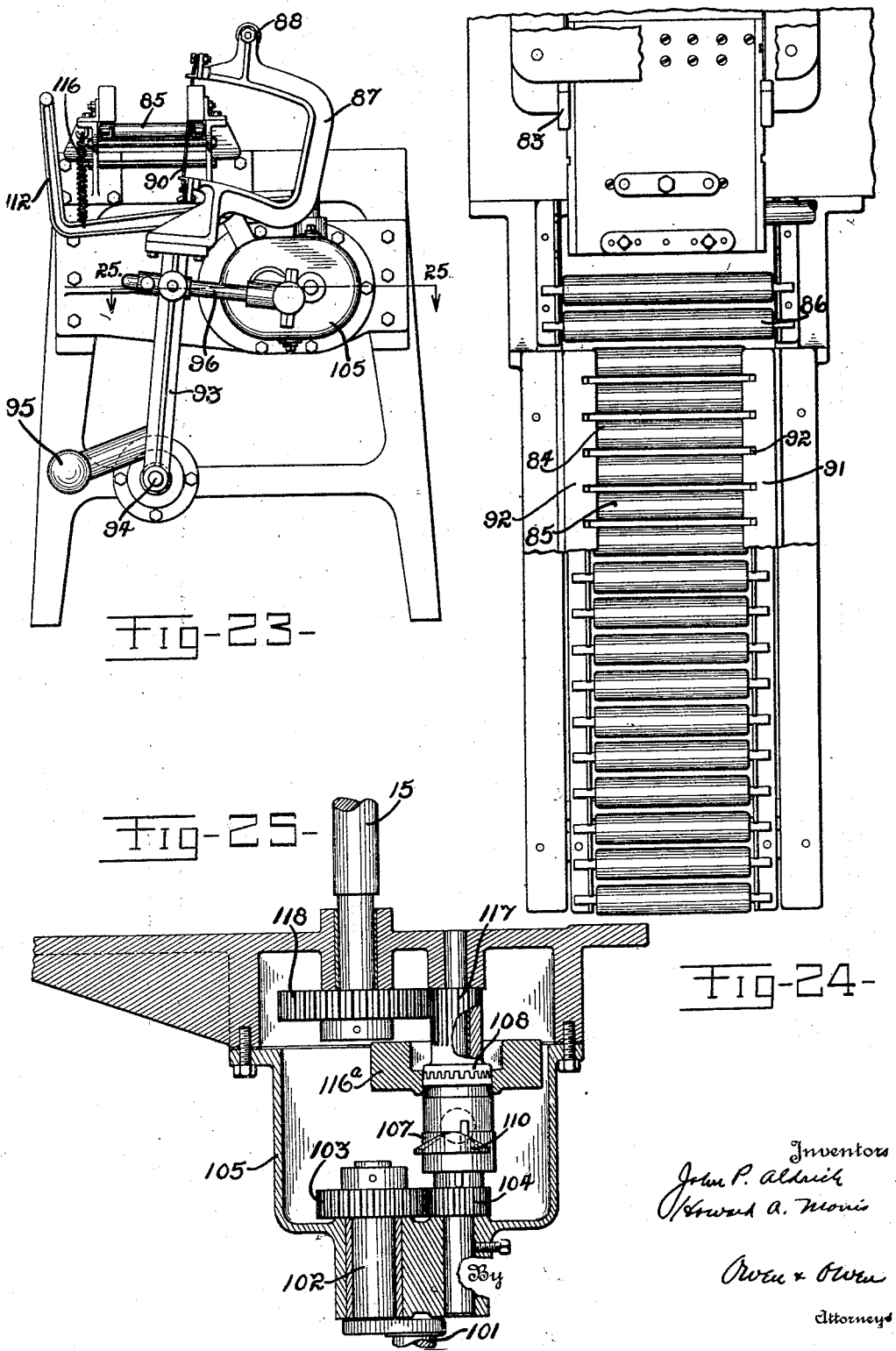

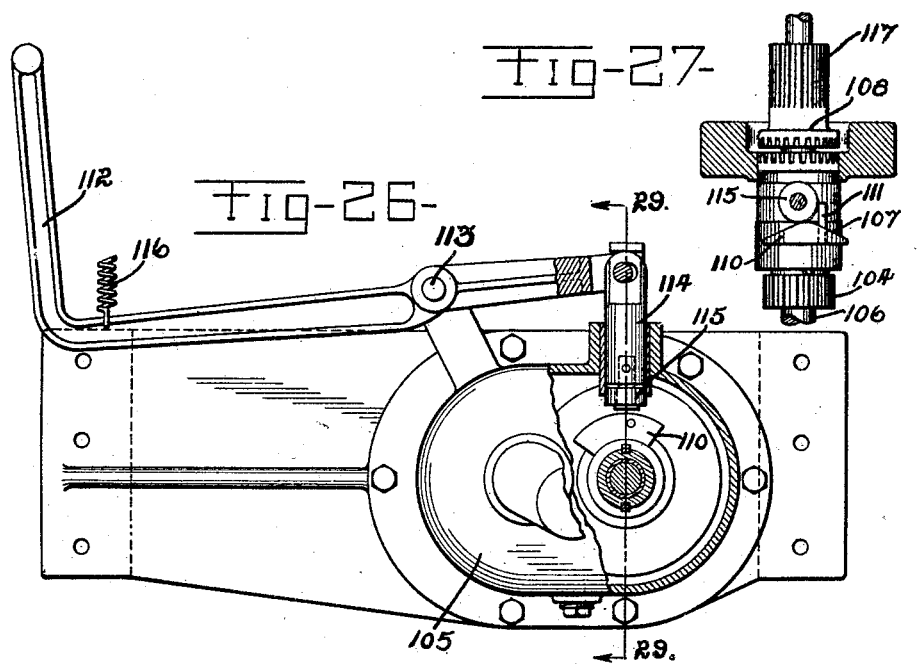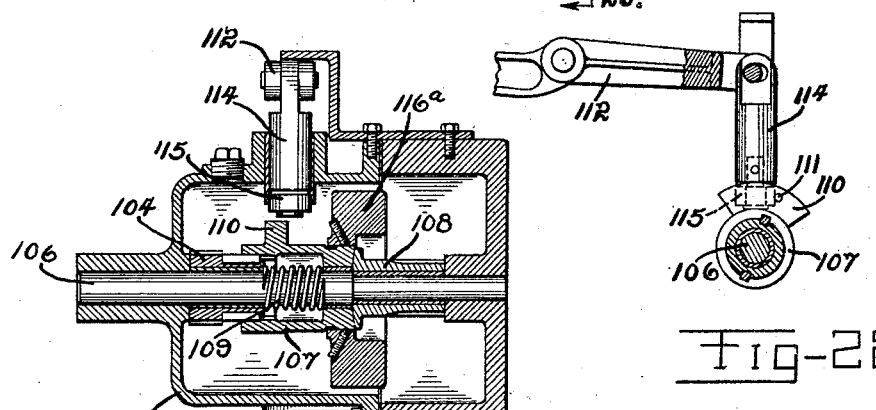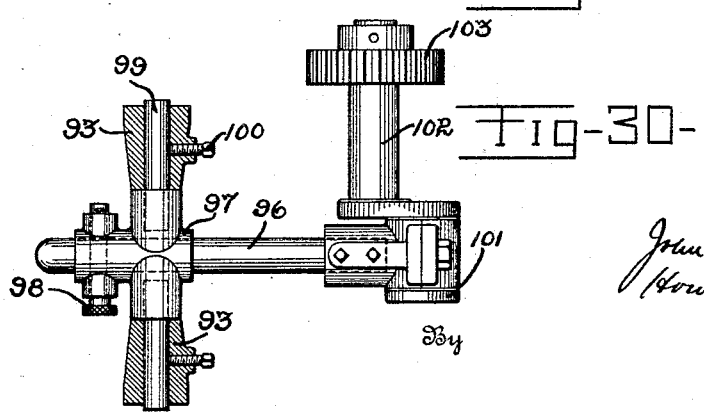

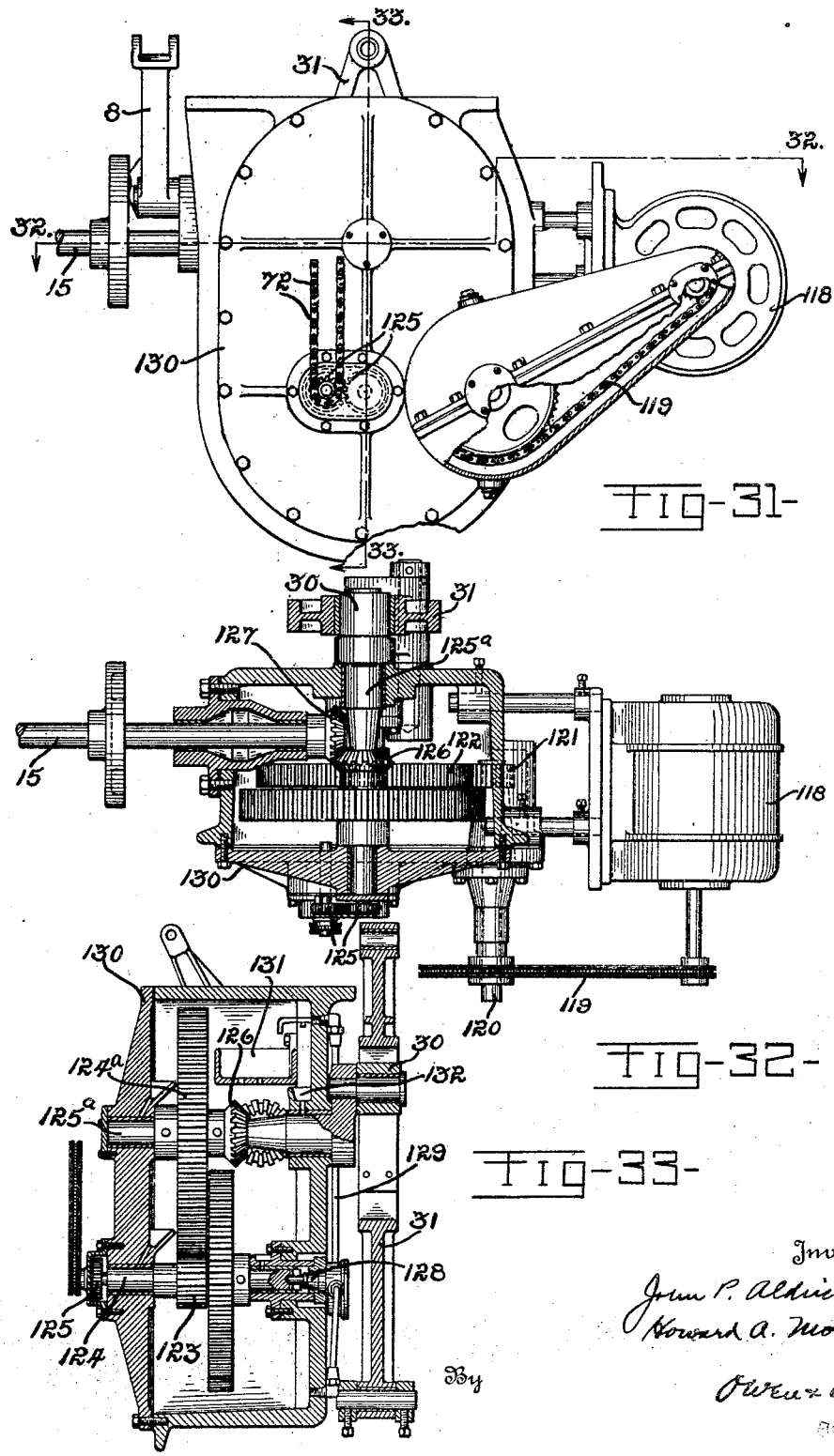

Patented Mar. 8, 1932

1,848,405

UNITED STATES PATENT OFFICE

JOHN P. ALDRICH AND HOWARD A. MORRIS, OF TOLEDO, OHIO, ASSIGNORS TO THE AUTOMAT MOLDING & FOLDING COMPANY, OF TOLEDO, OHIO, A CORPORATION OF OHIO

MACHINE FOR SHAPING AND CUTTING BUTTER OR LIKE MATERIALS

Application filed August 10, 1929. Serial No. 385,002.

This invention relates to machines for forming butter, oleomargarine or like plastic material into the desired shape for wrapping and packaging.

An object of this invention is to provide a simple and efficient machine for handling relatively large masses of butter, oleomargarine or the like, and shaping the same into bars or bricks of a size suitable for packaging, thereby effecting a saving in time and expense for doing that which heretofore was in the main effected in several disconnected operations.

A further object is to provide a machine of the above character having new and improved features of construction, arrangement and operation hereinafter described.

The invention is shown by way of illustration but not of limitation, in the accompanying drawings, in which,—

Figure 1 is a perspective view of a portion of the machine with the cut-off mechanism removed and showing the hopper in cross-section with the upper portion thereof spaced from the upper part of the machine; Fig. 2 is a side elevation partly in section of the machine; Fig. 3 is a transverse sectional elevation showing the hopper and knife arrangement; Fig. 4 is an enlarged transverse sectional elevation on the line 4—4 of Fig. 3; Fig. 5 is an enlarged sectional elevation showing the connection between the ram lever, ram connecting rod and the mounting thereof; Fig. 6 is a vertical sectional elevation showing the hopper, ram and associated parts; Fig. 7 is a vertical sectional elevation on the line 7—7 of Fig. 6 showing a cross-section of the ram head; Fig. 8 is a front end view of the ram showing the flap valve arrangement; Fig. 9 is an enlarged sectional view on the line 9—9 of Fig. 8 showing the construction of the flap valve; Fig. 10 is a longitudinal sectional view of the ram equipped with a valve of the poppet type; Fig. 11 is a perspective view of the separator or divider through which the butter is forced during the advancing movement toward the water-jacketed head; Fig. 12 is a diagrammatic view showing the wiring connections and gas line for the water heater; Fig. 13 is an end elevation of the water-jacketed head which forms a continuation of the guide way through which the butter is advanced; Fig. 14 is a side elevation of the head shown in Fig. 13; Fig. 15 is a transverse sectional view on the line 15—15 of Fig. 14; Fig. 16 is a transverse sectional view on the line 16—16 of Fig. 14; Fig. 17 is a longitudinal sectional view on the line 17—17 of Fig. 13; Fig. 18 is a transverse sectional view on the line 18—18 of Fig. 17; Fig. 19 is an enlarged longitudinal section on the line 19—19 of Fig. 17; Fig. 20 is a longitudinal sectional elevation of the head showing the passage of butter therethrough; Fig. 21 is a longitudinal sectional elevation similar to Fig. 20, showing the spacer in place for reducing the size of the butter stream forced through the head; Fig. 22 is a transverse sectional elevation on the line 22—22 of Fig. 14; Fig. 23 is an end elevation of the machine showing the cut-off mechanism; Fig. 24 is a top plan view of the jacketed head and platform associated with the cut-off mechanism; Fig. 25 is a sectional view on the line 25—25 of Fig. 23, showing the interior of the clutch housing and arrangement of the clutch parts; Fig. 26 is a side elevation partly in section showing the control lever and associated parts for operating the cut-off mechanism; Fig. 27 is a plan view of the clutch for the cutting mechanism; Fig. 28 is a detail view showing the end portion of the control lever and associated parts for operating the cut-off clutch; Fig. 29 is a sectional view on the line 29—29 of Fig. 26, showing the arrangement of the clutch parts when in operation; Fig. 30 is a detail view of the connection between the crank and cutter frame yoke; Fig. 31 is a side elevation of a portion of the drive mechanism for the machine; Fig. 32 is a sectional view on the line 32—32 of Fig. 31, showing the gear arrangement for operating the several parts; and Fig. 33 is a vertical sectional elevation of the line 33—33 of Fig. 31 further showing gearing for operating parts of the machine.

The illustrated embodiment of the invention comprises a machine for handling material of a plastic nature, such as butter, oleomargarine or the like, and shaping the material into suitable sizes ready for wrapping and packaging in a carton. Usually material such as butter is delivered to packers in tubs and before this material can be wrapped and packaged in cartons, each containing a pound, two half pound, or four quarter pound bars, it is necessary that the mass be worked into bars of the desired size. This has heretofore occasioned considerable difficulty and has been somewhat of a time consumer. This machine obviates the difficulty heretofore experienced, and provides a simple and efficient machine into which the butter may be dumped from the tub in a shapeless mass of uneven and irregular characteristics, and after the butter has passed through the machine it will not only be cut to the exact size desired, but it will be free from air holes and will have the proper grain.

Referring more particularly to the drawings, the machine comprises a frame 1 supported on suitable legs 2 and rising from the upper portion of the machine is a hopper 3 which terminates at its upper end in a platform 4 onto which butter is dumped from the tub or other container in any form of the proper size to drop into the hopper 3. The sides of the hopper and the platform 4 are preferably wooden for a purpose well understood to those skilled in this art. Reciprocable transversely of the lower portion of the hopper 3 is a knife blade 5 having a cutting edge at the outer end portion thereof. As shown, the knife is provided with grooved channels 6 at opposite longitudinal edges and these engage tongued guides 7 in order to guide the movement of the blade.

The knife 5 is actuated by a lever 8 which is pivoted adjacent its lower end at 9, and is adjustably pivoted at its upper end by a link 10 to a boss 11 depending from the underside of the blade. Mounted on the lever 8, adjacent to the pivot 9, is a roller 12, which engages in a cam groove 13 formed in a cam 14 which is fixed for rotation with a longitudinal drive shaft 15. The arrangement is such that the knife 5 is moved horizontally to sever a quantity of butter which has dropped through the hopper 3 and remains in such position for a predetermined time, thereby forming a closure for the lower end of the hopper. Thereafter the knife is retracted to the position shown in Fig. 3 to permit a further quantity of butter to drop through the hopper.

It will be observed that the cutting end 5ª of the knife 5 is beveled upwardly, and engageable with the upper surface of the knife blade is a wiper bar 16 urged into engagement with the knife blade by coiled springs 17 mounted on rods 18. This prevents the material from adhering to the knife blade when the latter is retracted. A wiper bar 19 is also positioned beneath the knife blade 5 and is urged into engagement with the blade by coiled springs 20 disposed in pockets 21. The normal position of the wiper bar 19 is regulated by bolts 22 which also serve as guides therefor.

A guideway 23 preferably lined with wood and rectangular in cross-section extends longitudinally of the machine frame, a portion being disposed directly beneath the hopper 3 to receive a quantity of butter dropped therefrom. After the knife 5 has operated to sever a portion of the mass, a ram 24 operates to advance the severed mass longitudinally along the guideway, the knife blade 5 remaining in closed position and forming a top wall for the guideway.

The ram 24 consists of a head 25 and connecting rod 26. The latter is pivoted at 27 to an actuating lever 28 which is pivoted at its lower end at 29 and is oscillated by a crank 30 engaging bearing plates 31 intermediate the ends of the lever. The connection between the connecting rod 26 and lever 27 is shown in Fig. 5 in which the pin 32 forming the pivotal connection between the parts is extended beyond the ends thereof and is provided with rollers 33 engaging in horizontally disposed guides 34 for guiding the movement of the ram in a horizontal direction longitudinally in the guideway 23.

The head 24 is provided with relatively narrow slide plates 35 and a plate 36 which are urged outwardly from the head by coil springs 37, thereby intimately to engage the walls of the guideway 23. A passage 38 extends through the head 24 from the front thereof and registers with the hollow bore 39 of the connecting rod 26 to prevent the formation of a vacuum in advance of the ram when the latter is retracted.

The opening 38 is controlled by a valve, one form thereof being shown in Figs. 8 and 9 as consisting of a plate 40 inclosed within a sheath 41 of fabric. Another plate 42 spaced slightly from the plate 40 is anchored to the front end of the head 24 by screws 43. A line of stitching 44 intermediate the plates 40 and 42 serves to hold the plate 40 in the proper position. The operation is such that in the advancing movement of the ram the fabric 41 engages the butter and upon retracting movement the valve swings sufficiently to permit air to pass into the guideway and prevent the creation of a vacuum.

As shown in Fig. 10, a poppet valve 44 controlled by a spring 45 may constitute an alternate form of valve mechanism for relieving the pressure within the guideway occasioned by the retraction of the ram.

It is undesirable that the butter be mashed by the force of the ram advancing through the guideway 23. This is also undesirable because it destroys the grain in the butter and minimizes the commercial possibilities of the product. For this reason, there is interposed in the path of movement of the butter a divider or separator 46 which consists of an upper plate 47 and a lower plate 48. The plates have beveled edges 49 to direct the butter therebetween. Interposed between the plates and connected thereto are pairs of baffles 50 and 51. These baffles are inclined in opposite directions substantially, as shown, and the space between the baffles of each pair at the receiving end are closer together than at the outlet end. It will be apparent that the butter forced into engagement with the separator 47 will pass therethrough in irregular streams and in such manner that mashing of the butter is prevented and the grain is retained substantially in its original condition.

Positioned in the path of movement of the butter mass and forming substantially a continuation of the guideway 23 is a water-jacketed head 52. An important function of this head is to keep the butter at the proper temperature and to prevent the creation of streaks in the butter during its travel. The head 52 consists of an inner chamber 53 through which the butter passes and an outer chamber or water-jacket 54 in which water is continuously circulated. The chamber 53 is rectangular in cross-section and at the receiving end is beveled at 55 substantially as shown in Fig. 20. The walls of the inner chamber 53 are made up of a plurality of plates which are secured to the outer wall by screws 56. Suitable partitions are provided in the head to enable the water to pass into the water-jacket through the inlet 57 and pass around the head to the outlet 58. Inlet and outlet pipes 59 and 60, respectively, lead from a water reservoir 61.

In order to vary the size of the butter stream passing from the head 52 in the formation of bars of half pound or quarter pound size, a spacer 62 may be attached to the upper wall of the chamber 53. As shown, spacer 62 has a downwardly inclined rear portion 63. A block 64, interposed between the spacer 62 and the top wall of the chamber 53 is held in place by screws 65. Interposed between the outer end portion of spacer 62 and the top wall of the chamber is a block 66 which may be adjusted to the desired position by set screws 67. In order to close the openings through which the screws 65 extend, a filler 68 having pins 69 and an attaching screw 70 is provided.

The water from the reservoir 61 is pumped through the pipe 59, head 52 and pipe 60 by a suitable pump 71 which is driven by a chain and sprocket 72 in such a manner that continuous circulation is maintained. It is desirable that the water in the head 52 be kept at approximately 90° F. and in order to accomplish this an electric heater 73 is positioned within the reservoir 61. As shown diagrammatically in Fig. 12, leads 74 and 75 extend from the heater, the lead 75 extending to a thermostatic control 76 of any suitable form, but in this instance a mercoid control is shown, having a gas line 77 leading to the reservoir 61, the thermostatic device controlling a switch 78. The lead 75 is also interposed by a manually controlled switch 79, which must initially be closed in order to energize the heater 73. As shown, a pilot light 80 is connected to the circuit for visibly indicating when the heater is in operation. It is apparent by the above arrangement that so long as the switch 79 is closed, water in the reservoir 61 which is circulated to the head 52 is maintained at a predetermined temperature.

It is apparent that the ram 24 operates to force the butter along the guideway 23 through the separator 47 and the water-jacketed head 52. As above mentioned, the inside of the head is smaller than the guideway and this serves to compress the mass of butter to the proper size and also eliminates the air pockets 81, as shown in Fig. 19, so that as the mass leaves the head 52 it is entirely free from air holes.

Formed at opposite sides of the head 52 are a plurality of vertically disposed grooves 82 which are adapted to register with similarly shaped grooves in the side frame of the machine. The head is held in adjusted position by means of keys 83 which are inserted through the registering slots in the head and side frame of the machine. It is found desirable to adjust the position of the head 52 toward or away from the hopper 3 according to the texture of the butter. From the above arrangement it is apparent that this adjustment may be readily and conveniently effected by merely removing the keys 83 and moving the head to the desired position.

From the head 52 the butter is delivered to a platform 84 made up of a plurality of rolls 85 which are spaced axially from each other. In the rear of the rolls 85 are rolls 86 supported in grooves 87. These rolls may be removed to allow for adjustment of the head 52. Carried by a frame 87ª having a handle 88 is a cutter-head 89 having a plurality of vertically disposed cutting wires 90. A wire is positioned between each pair of rolls 85. The wires are spaced from each other at such distance to cut the butter bars of the desired size. It will be apparent that by removing alternate wires larger bars may be cut.

Rising from opposite sides of the rolls 85 are longitudinally extending wooden bars 91 having a plurality of grooves 92 to receive the wires 90 when moved from one side to the other. These bars also form a guide for the movement of the butter.

As shown in Fig. 23, the frame 87 is mounted on a lever 93 which is pivoted at its lower end at 94. A counter weight 95 is connected to the lever 93 to hold the frame 87 in position when it has been moved to the left of Fig. 23, the weight being sufficient to overbalance that of the frame 87.

The lever 93 is actuated by a rod 96 which extends through a bracket member 97 and is connected thereto by a removable pin 98. Rods 99 extend through the arms of the lever 93 and into the bracket 97, set screws 100 being provided to hold the rods in place. By removing the pin 98 it is apparent that the rod 96 may be disconnected from the lever 93 and the frame 87 may thereafter be swung manually with respect to the platform 84, the handle 88 being provided for this purpose.

The inner end of the rod 96 is connected to a crank 101 mounted on a shaft 102. Fixed to the shaft 102 is a gear 103 which meshes with a pinion 104 positioned within the clutch housing 105. The pinion 104 is fixed to a shaft 106 on which are mounted clutch parts 107 and 108. The clutch part 108 is fixed to rotate continuously with the shaft 106 but the clutch part 107 is free to move relatively to the shaft, a coil spring 109 encircling the shaft 106 urges the clutch part 107 toward engagement with part 108. Formed on the clutch part 107 is a cam member 110 provided with oppositely tapering sides and having a pin 111 projecting laterally therefrom.

For controlling the operation of the cutter head 89 and the frame 87, a control lever 112 is pivoted intermediate its ends at 113 and depending from the inner end is a pin 114, which is provided with a roller 115 at its lower end. The lever 112 is normally held by a coil spring 116 in such position that the roller 115 engages the cam 110, as shown in Fig. 27, and holds the clutch parts 107 and 108 out of engagement. By pressing down on the outer end of the lever 112, it is apparent that the roller 115 is lifted away from the cam 110 to permit the coil spring 109 to force the clutch parts into engagement.

Upon engagement of the clutch parts the lever 93 through the above described connections is swung in a horizontal direction from one side of the platform 84 to the other side. It is apparent that as soon as the operating lever 112 is released the spring 116 returns the roller 115 to its normal position, and when the cam 110 engages the roller the clutch part 107 will be cammed out of engagement with the clutch part 108.

From the above description it will be manifest that in the operation of the butter cut-off mechanism it is merely necessary to press down on the operating lever 112 and the cutter head and frame 87 are moved across the platform 84 to cut the butter into the desired lengths and after this movement is completed the clutch parts are disengaged. In order to measure the proper action of the clutch a fly wheel 116ᵃ is attached to the clutch part 107.

The clutch part 108 has gear teeth 117 which mesh with a gear 118 fixed to the main drive shaft 15. As shown in Fig. 2, a drive shaft 15 extends longitudinally of the machine frame. Power is delivered to the main drive shaft and associated parts in the following manner. An electric motor 118 is secured to one end of the machine frame and has a sprocket and chain connection 119 with a shaft 120 on which is mounted a pinion 121. The pinion 121 meshes with a relatively large gear 122 which in turn meshes with a pinion 123 mounted on a shaft 124. Through gears 125 the shaft 124 is connected to drive the sprocket and chain connection 72 which operates the water pump 71. The pinion 123 meshes with a gear 124ᵃ mounted on a shaft 125ᵃ on which is also mounted a bevel gear 126. The bevel gear 126 meshes with a bevel gear 127 which is fixed to the main drive shaft 15. Provided on the outer end of the shaft 125ᵃ is the crank 30 for operating the ram lever 31.

Driven from the shaft 124 is an oil pump 128 which delivers oil through the line 129 to the upper portion of the gear housing 130, discharging into a perforated receptacle 131 and a cup 132, so that the gears operate in a bath of oil.

While the above description has been given as relating particularly to the shaping of butter bars or bricks, it is to be understood that this description is given by way of illustration and not of limitation, because the machine is adapted for use in connection with materials other than butter. Numerous changes in detail of construction, arrangement and operation may be effected without departing from the spirit of the invention, especially as defined in the appended claims.

What we claim as new and desire to secure by Letters Patent is:

1. In apparatus of the class described, a guideway, a ram for advancing butter or like material over said guideway, an adjustable head forming a continuation of said guideway, but adjustable longitudinally relative thereto, said head having a plurality of vertical grooves spaced laterally from each other, and means selectively engageable with one of said grooves and guideway for securing said head in adjusted position.

2. In apparatus of the class described, an enclosed guideway, a ram for advancing butter or like material along said guideway, an adjustable head in telescopic engagement with said guideway, said head having a plurality of vertical grooves spaced laterally from each other, and a pin for selective engagement with said grooves for retaining said head in adjusted position.

3. In apparatus of the class described, a hopper adapted to receive a quantity of butter or like material, a substantially enclosed longitudinally extending butter passage beneath said hopper, knife means reciprocable transversely of said longitudinal butter passage and providing a closure for the lower end of the hopper after severing the butter, a ram for advancing the severed mass of butter along said guideway, and mechanism for actuating said ram in timed relation to said knife means so that said knife means has completely severed a quantity of butter and is in closed position before operative movement is imparted to said ram.

In testimony whereof we have hereunto signed our names to this specification.

JOHN P. ALDRICH.
HOWARD A. MORRIS.